United States Patent
Inukai

[19]
[11] Patent Number: 6,064,124
[45] Date of Patent: May 16, 2000

[54] POWER SUPPLYING APPARATUS FOR USE IN AN IMAGE FORMING APPARATUS

[75] Inventor: Katsumi Inukai, Iwakura, Japan

[73] Assignee: Brother Kogyo Kabushiki Kaisha, Nagoya, Japan

[21] Appl. No.: 09/158,157

[22] Filed: Sep. 22, 1998

[30] Foreign Application Priority Data

Sep. 24, 1997 [JP] Japan .................................. 9-258884

[51] Int. Cl.$^7$ .................................................. H02J 1/00
[52] U.S. Cl. ................. 307/43; 307/75; 307/114
[58] Field of Search ..................... 307/43, 44, 56, 307/72, 75, 80, 85, 86, 141, 141.4, 98, 99; 399/69, 70, 88; 355/285; 361/30, 31, 38, 58, 79, 89, 94, 83; 363/74, 75, 78

[56] References Cited

U.S. PATENT DOCUMENTS

| | | | |
|---|---|---|---|
| 4,791,528 | 12/1988 | Suzuki et al. | 361/235 |
| 4,839,698 | 6/1989 | Inuzuka et al. | 355/243 |
| 5,043,595 | 8/1991 | Sugiyama | 307/39 |
| 5,285,368 | 2/1994 | Ishikawa | 363/21 |
| 5,559,660 | 9/1996 | Watson et al. | 361/58 |
| 5,600,406 | 2/1997 | Aikawa et al. | 399/70 |
| 5,656,187 | 8/1997 | Miyamoto et al. | 219/216 |
| 5,684,685 | 11/1997 | Komatsu et al. | 363/95 |
| 5,814,978 | 9/1998 | Ida | 323/282 |
| 5,881,335 | 3/1999 | Yang | 399/70 |

Primary Examiner—Jeffrey Gaffin
Assistant Examiner—Peter Zura
Attorney, Agent, or Firm—Oliff & Berridge, PLC

[57] ABSTRACT

In a power supplying apparatus for use in an image forming apparatus, when a first transistor is switched on, a first photo-triac coupler and a first triac switch on so that a fixing heater is powered on. After a predetermined time, a second transistor is switched on. A second photo-triac coupler and a second triac are thereby switched on so that the fixing heater is powered on. The first triac is then switched off. The first triac is connected in series to a resistor, so that when the first triac is switched on but the second triac remains off, the voltage applied to the fixing heater is sufficiently low in comparison with the voltage applied thereto when the second triac is switched on. Therefore, when the fixing heater is powered on by switching on the first transistor to switch on the first triac, a large power surge does not occur. When the second triac is switched on, a large power surge does not occur either since the fixing heater has already been powered on. Occurrence of power surges through the fixing heater is thereby reduced.

21 Claims, 7 Drawing Sheets

LAMP CURRENT (EFFECTIVE VALUE)

POWER SUPPLYING APPARATUS FOR USE IN AN IMAGE FORMING APPARATUS

BACKGROUND OF THE INVENTION

1. Field of Invention

The invention relates to a power supplying apparatus for use in an image forming apparatus that supplies power to an electrical load in an image forming apparatus and, more specifically, to a power supplying apparatus capable of preventing occurrence of a power surge when the electrical load is powered on.

2. Description of Related Art

As a typical electrical load in an image forming apparatus, a fixation device for use in, for example, copiers, laser printers and the like, is known which heats and fixes toner transferred from a photosensitive drum, or the like, to a recording medium, such as a copy paper sheet, or the like. In such a fixation device, a heater employing a halogen lamp, or the like, has been considered for use as a fixation-heating device for fixing toner by heating. It has also been considered that the surface temperature, or the like, of a heating roller having a built-in heating lamp is detected by a thermister (thermal resistor), or the like, and the power supplied to the lamp is controlled by using a triac (triode AC switch), or the like, so that the roller surface temperature, or the like, becomes equal to a desired temperature.

FIG. 7 is a timing chart illustrating an example of the aforementioned control. In the control illustrated in FIG. 7, a lamp-vicinity temperature (A) is detected by a thermister, or the like, and a heating lamp is switched on and off (B) so that the lamp-vicinity temperature (A) changes between a minimum value TA and a maximum value TB. That is, if the temperature decreases to TA, the lamp is switched on. The on-state of the lamp is continued until the temperature increases to TB. When the temperature reaches TB, the lamp is switched off. The off-state of the lamp is continued until the temperature decreases to TA. When the temperature decreases to TA, the lamp is switched on again. This control is repeated.

During this control, however, immediately after the lamp is switched on, that is, immediately after power is supplied to the lamp, a large or surge current (normally termed a power surge) flows through the lamp as indicated in FIG. 7. In a case where a copier, or the like, and lighting fixtures, and the like, are connected to a common power source as in an office, the power voltage of the lighting fixtures decreases every time the power surge flows through the copier, or the like. If a power surge occurs, for example, at a frequency of about 8.8 Hz, there occurs an undesired flickering of the lighting fixtures. Considering the recent increase of the use of large-power heating lamps of about 10 kW as fixation-heating devices, prevention of flickering caused by the power surge is desired. In addition to the flickering, the voltage fall caused by the power surge can possibly have other adverse effects on various appliances.

SUMMARY OF THE INVENTION

Accordingly, the invention provides a power supplying apparatus for use in an image forming apparatus that is capable of considerably reducing the occurrence of surge current (or power surge) at the time of supplying power to an electrical load provided in the image forming apparatus.

According to one aspect of the invention, there is provided a power supplying apparatus for use in an image forming apparatus for supplying power to electrical load in the image forming apparatus, including a first power supply (or electrification) device for supplying power to the electrical load by applying thereto a first predetermined voltage, a second power supply (or electrification) device for supplying power to the electrical load by applying thereto a second predetermined voltage that is lower than the first predetermined voltage, and a power supply control device for starting power flowing from the second power supply device and, after a predetermined delay time, starts power flowing for the first power supply device.

When power is applied to the electric load by the power supplying apparatus of the invention, the power supply control device starts power flowing from the second power supply device and, after a predetermined delay time, starts power flowing from the first power supply device. The second power supply device supplies power to the electrical load by applying thereto the second predetermined voltage that is lower than the first predetermined voltage. Therefore, when power is supplied to the electrical load by the second power supply device, a significantly large power surge does not occur. When power is supplied to the electrical load by the first power supply device, a significantly large power surge does not occur despite the application of the first predetermined voltage, that is, a relatively high voltage, because the power is already being supplied by the second power supply device. Therefore, the power supplying apparatus of the invention is able to considerably reduce the occurrence of a power surge. Consequently, it becomes possible to substantially prevent the flickering of office lights, etc., and other adverse effects on other electrical appliances caused by such a power surge.

The power supplying apparatus may further have the following structure. That is, the first power supply device and the second power supply device use power from a common power source to power the electrical load. The second power supply device has an impedance which is connected in series between the power source and the electrical load and which is greater than an impedance of the first power supply device. The second power supply device utilizes a voltage fall by the impedance of the second power supply device so that the second predetermined voltage which is lower than the first predetermined voltage, is applied to the electrical load.

In this structure, the second power supply device is provided with the impedance connected in series between the power source and the electrical load. The impedance of the second power supply device is greater than the impedance of the first power supply device. By utilizing a voltage fall by the impedance of the second power supply device, the second predetermined voltage lower than the first predetermined voltage is applied to the electrical load. Therefore, even through the first power supply device and the second power supply device use a common power source to power the electrical load, the voltage applied to the electrical load by the first power supply device (the first predetermined voltage) and the voltage applied thereto by the second power supply device (the second predetermined voltage) can easily be made to differ. Consequently, the invention can advantageously simplify the apparatus structure and considerably reduce the production cost.

The electrical load may be a fixation-heating device for fixing an image to a recording medium by heating. If the electrical load is a fixation-heating device, the supply of power to the fixation heating device increases its resistance due to its heat generation, the application of the second predetermined voltage (a relatively low voltage) to the electrical load beforehand remarkably reduces occurrence of a power surge when the applied voltage is increased to the first predetermined voltage. Thus, occurrence of a power surge can be reduced in a further favorable manner.

The power supplying apparatus may further include a temperature detection device for detecting a temperature in the vicinity of the electrical load, and a control device for controlling the first power supply device and the second power supply device on the basis of a result of detection by the temperature detection device. Therefore, it becomes possible to control the first and second power supply devices on the basis of the result of detection by the temperature detection device so that a substantially constant temperature of the electrical load is maintained.

According to another aspect of the invention, there is provided a power supplying apparatus for use in an image forming apparatus for supplying power to an electrical load in the image forming apparatus, including a first power supply device that supplies power to the electrical load by applying thereto a first predetermined voltage, a second power supply device that supplies power to the electrical load by applying thereto a second predetermined voltage that is lower than the first predetermined voltage, and a power supply controller that starts power flowing from the second power supply device and, after a predetermined delay time, starts power flowing from the first power supply device.

The power supplying apparatus according to the second aspect of the invention may further have the following structure. That is, the first power supply device and the second power supply device use power from a common power source to supply power to the electrical load. The second power supply device has an impedance which is connected in series between the power source and the electrical load and which is greater than an impedance of the first power supply device. The second power supply device applies to the electrical load the second predetermined voltage lower than the first predetermined voltage, by utilizing a voltage fall by the impedance of the second power supply device.

The electrical load may be a fixing heater that fixes an image to a recording medium by heating. Alternatively, the electrical load may be a lamp. If the electrical load is a lamp, a large power surge occurs and, therefore, the prevention or reduction of the occurrence of a power surge becomes particularly important. Therefore, the advantages of the invention become more remarkable in a power supply apparatus for use in an image forming apparatus wherein the electrical load is a lamp.

Each of the first and the second power supply devices may have a triac. The first power supply device may have a photo-triac that controls the triac of the first power supply device, and the second power supply device may have a photo-triac that controls the triac of the second power supply device.

Furthermore, the first power supply device may have a transistor that controls the photo-triac of the first power supply device, and the second power supply device may have a transistor that controls the photo-triac of the second power supply device.

The power supplying apparatus for use in an image forming apparatus may further include a temperature detector that detects a temperature in the vicinity of the electrical load, and a controller that controls the first power supply and the second power supply on the basis of a result of detection by the temperature detector.

BRIEF DESCRIPTION OF THE DRAWINGS

A preferred embodiment of the present invention will be described in detail with reference to the following figures wherein.

DETAILED DESCRIPTION OF PREFERRED EMBODIMENTS

Figure 1:
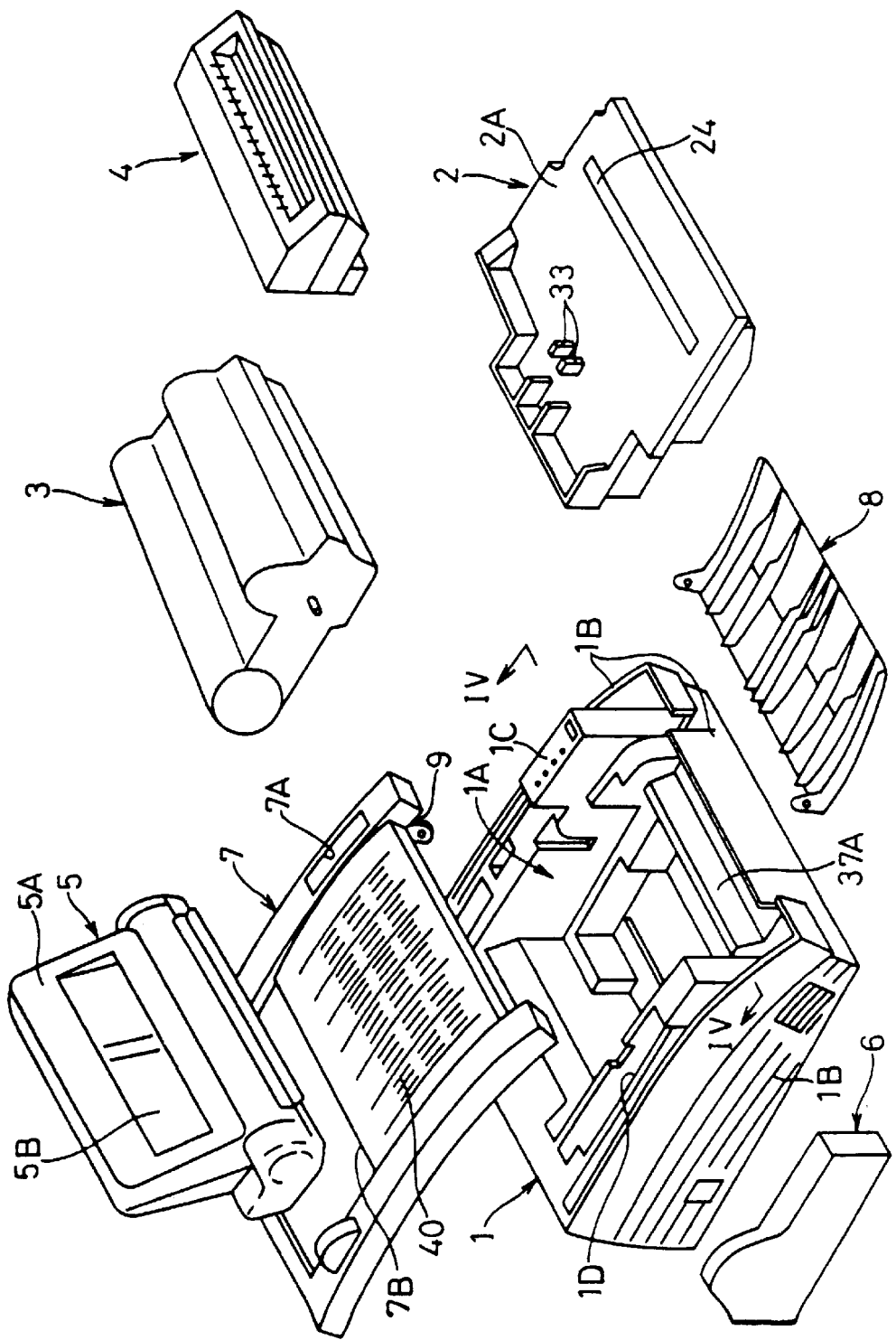
FIG. 1 is an exploded perspective view of main components of a laser printer according to an embodiment of the invention.
Figure 2:
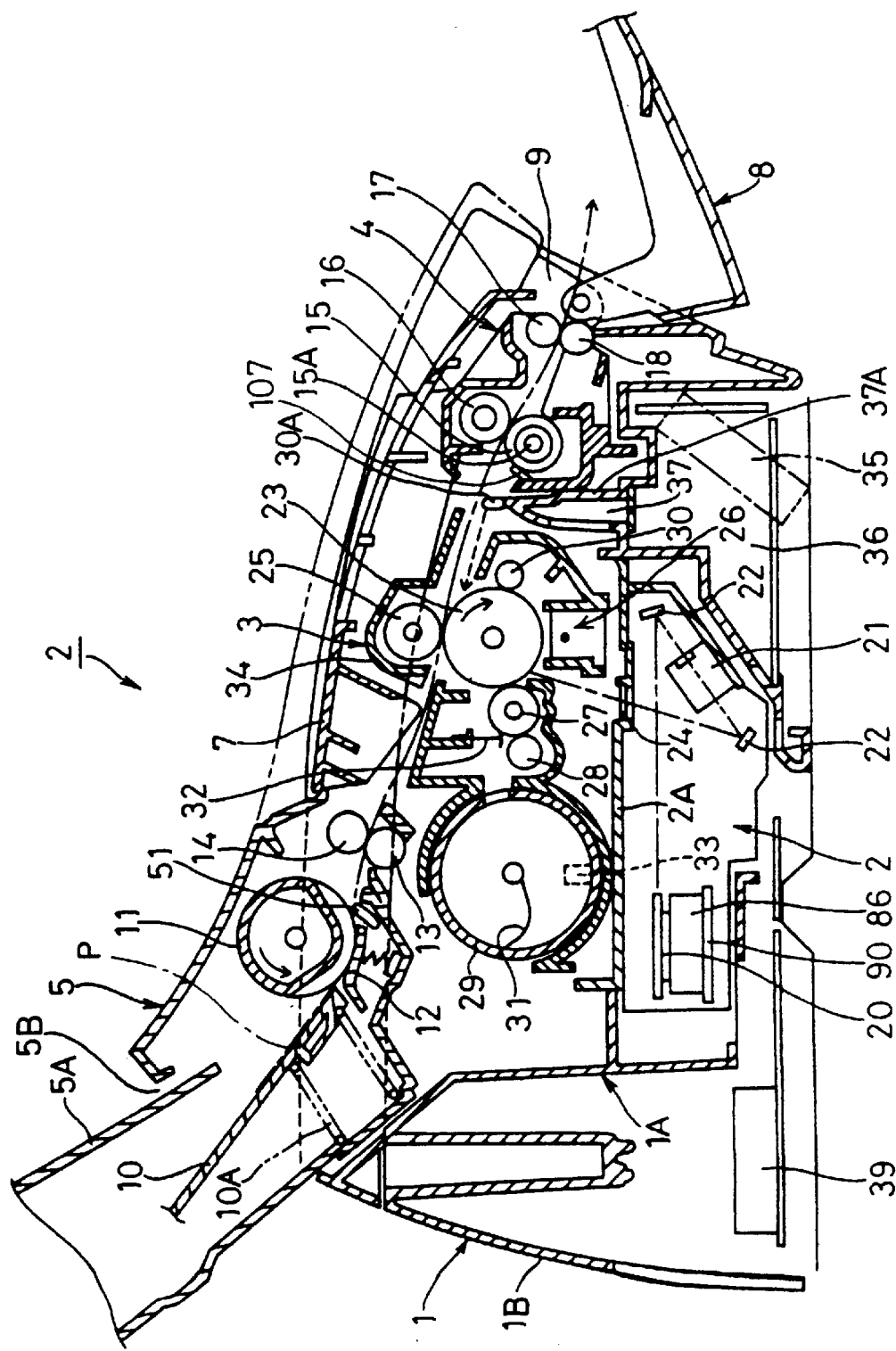
FIG. 2 is a schematic side sectional view of the laser printer shown in FIG. 1.

FIG. 1 is an exploded perspective view of main components of a laser printer, that is, an image forming apparatus. FIG. 2 is a schematic side sectional view of the laser printer.

As shown in FIG. 1, a synthetic resin-made main casing 1 of the laser printer is formed by a main frame 1A, and a main cover 1B covering the four sides of the main frame 1A (front, rear, right and left sides). The main frame 1A and the main cover 1B have been unitarily formed by injection molding or the like. Attached from above to the main frame 1A are a scanning unit 2 provided as an exposure unit, a process unit 3 provided as a transfer unit, a fixing unit 4 and a sheet feeder unit 5.

A drive unit 9, including a main motor 84 (see FIG. 3) and a gear train, is placed and fixed in a housing recess 1D defined between an inner surface of a left side (in FIG. 1) of the main cover 1B and an adjacent left side surface of the main frame 1A by inserting the drive unit 9 from below the main casing 1. A synthetic resin-made top cover 7 provided as a body cover for covering upper surfaces of the main frame 1A and the main cover 1B, has a hole 7A through which an operating panel portion 1C protruding upward from a right side portion of the main frame 1A is inserted, and a hole 7B through which a base portion of the sheet feeder unit 5 is inserted. A sheet discharge tray 8 is vertically connected at its base portion to brackets 9 (only one of which is shown in FIG. 1) protruding from forward right and left sides of the top cover 7. When not in use, the sheet discharge tray 8 can be folded to cover an upper surface of the top cover 7.

A stack of recording sheets P, that is, recording media, are set in a feeder case 5A in the sheet feeder unit 5. As shown in FIG. 2, a leading edge portion of the stack of recording sheets P are pressed toward a feed roller 11 by a support plate 10 having an urging spring 10A within the feeder case 5A. The feed roller 11 is rotatable by a driving force transmitted from the drive unit 6. The recording sheets P can be separated from the stack, one sheet at a time, by the feed roller 11 and a separating pad 12. The thus-separated recording sheet P is conveyed to a pair of upper and lower register rollers 13, 14.

The process unit 3 forms an image of toner on a surface of the recording sheet P conveyed by the register rollers 13, 14. The fixing unit 4 then heats the recording sheet P carrying the toner image thereon by claiming it between a heat roller 15 and a pressure roller 16, thereby fixing the toner image on the recording sheet P. The heat roller 15 is formed by a fluorine-coated aluminum tube in which a fixing heater 15A formed by a halogen lamp is inserted. An approximately central portion of the heat roller 15 in the direction of its length is in contact with a thermister 107. The pressure roller 16 is a rubber roller coated with a fluororesin.

A sheet discharge section includes a discharge roller 17 and a pinch roller 18 that are disposed downstream within a case of the fixing unit 4. The sheet discharge section discharges the recording sheet P carrying the fixed toner image thereon, onto the sheet discharge tray 8. Thus, a recording sheet conveyance path extends from the feed roller 11 to the sheet discharge section. The sheet feeder unit 5 has an manual insert opening 5B that opens obliquely upward. Therefore, a recording sheet can be inserted from the manual insert opening 5B into the recording sheet conveyance path, for example, in a case where it is desired to print on a recording sheet that is different from the recording sheets P set in the feeder case 5A.

The process unit 3 is disposed in an approximately central portion (in a plan view) within the main frame 1A having a box shape with an open upper side. Below the process unit 3, a synthetic resin-made upper support plate 2A of the scanning unit 2 is fixed, by using screws or the like, to a stay portion formed integrally with an upper side of a bottom plate portion of the main frame 1A. The scanning unit 2 includes a laser light emitting section (not shown), a polygon mirror 20, a lens 21, a reflecting mirror 22 and the like that are disposed under the upper support plate 2A. A transversely elongated scanning hole extends in the upper support plate 2A in the direction of the axis of a photosensitive drum 23 provided as a photosensitive body in the process unit 3. A glass plate 24 is disposed covering the scanning hole. The scanning unit 2 is designed to expose an outer peripheral surface of the photosensitive drum 23 by emitting and directing a laser beam thereto through the transversely elongated scanning hole and the glass plate 24.

As shown in FIG. 2, the process unit 3 includes the photosensitive drum 23, a transfer roller 25 in contact with an upper surface of the photosensitive drum 23, a charger 26, for example, a scorotron type charger, disposed below the photosensitive drum 23, a development device having a developing roller 27 and a supplying roller 28 that are disposed upstream of the photosensitive drum 23 in the sheet conveying direction, a developer (toner) supplier section disposed at an upstream side of the development device, that is, a detachable toner cartridge 29, a cleaning roller 30 disposed at a downstream side of the photosensitive drum 23, a destaticizer lamp 30A disposed downstream of the photosensitive drum 23, and the like.

An electrostatic latent image is formed on the outer peripheral surface of the photosensitive drum 23 by the scanning unit 2 scanning the laser beam over a photosensitive layer charged by the charger 26. Toner is stirred by a stirrer 31 in the toner cartridge 29 and discharged therefrom, and then it is transported by the supplying roller 28 to an outer peripheral surface of the developing roller 27. The toner layer carried on the developing roller 27 is restricted in thickness by a blade 32. The electrostatic latent image on the photosensitive drum 23 is made visible by deposition of developer (toner) from the developing roller 27. The image formed by the developer (toner image) is transferred to the recording sheet P conveyed between the photosensitive drum 23 and the transfer roller 25 receiving a transfer bias of an electric potential that is opposite in polarity to the electric potential of the photosensitive drum 23. A toner image is thus formed on the recording sheet P. Residual toner is temporarily recovered from the photosensitive drum 23 by the cleaning roller 30, and then returned to the photosensitive drum 23 at a predetermined time so that the toner is recovered by the developing roller 27 within the process unit 3.

A toner sensor 33 is disposed on the upper support plate 2A of the scanning unit 2, protruding upward therefrom. The toner sensor 33 has a light emitting portion and a light receiving portion, and protrudes into a bottom recess of the toner cartridge 29 in the process unit 3 so as to detect the presence of toner within the toner cartridge 29.

The process unit 3 is contained in a synthetic resin-made case 34, thereby forming a cartridge. The cartridge-type process unit 3 is detachably attached to the main frame 1A.

A fan housing portion 36 housing a cooling fan 35 is formed under a connecting portion between a front portion of the main frame 1A and a front portion of the main cover 1B. The fan housing portion 36 is in communication with a ventilation duct 37 extending in right-left directions perpendicular to the conveying direction of the recording sheet P. An upper plate portion 37A of the ventilation duct 37 has an inverted "V" sectional shape in which the opening faces downward. The upper plate portion 37A is positioned between the process unit 3 and the fixing unit 4 so as to prevent direct heat conduction from the heat roller 15 of the fixing unit 4 to the process unit 3.

Cooling air driven by the cooling fan 35 flows through the ventilation duct 37 and then along a side lower surface of the main frame 1A, to reach and cool a power section 39 (see FIG. 8) disposed rearward and the main motor 84 of the drive unit 6. Cooling air also flows out of a plurality of slits of the upper plate portion 37A that face the process unit 3, and ascends between the process unit 3 and the fixing unit 4, and flows out from the printer apparatus through a plurality of discharge holes 40 formed in the top cover 7.

Figure 3:
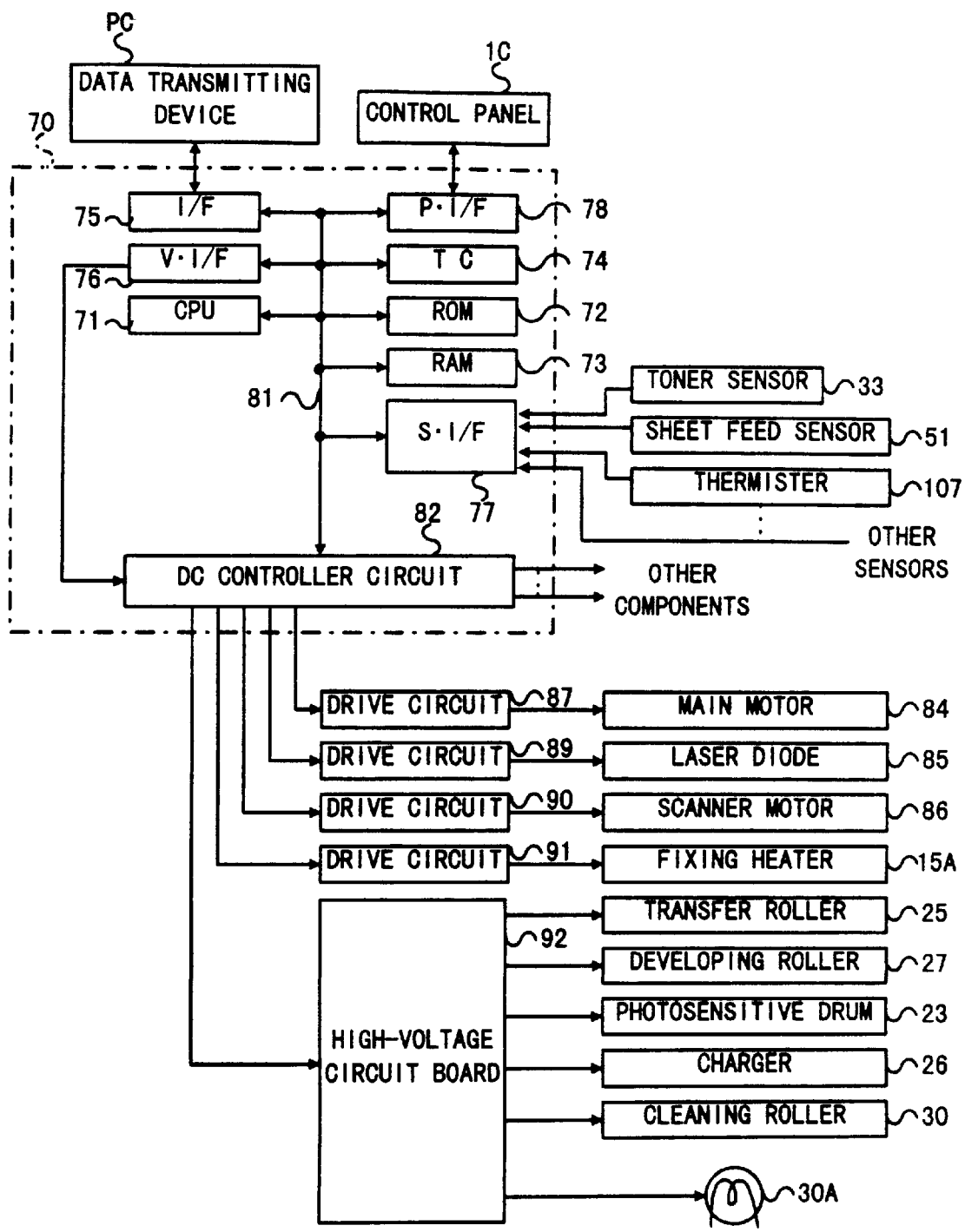
FIG. 3 is a block diagram illustrating a control unit and an arrangement related to the control unit in the laser printer.

A control unit 70 provided in a space partially defined by a right-side portion of the main frame 1A will be described below. FIG. 3 is a block diagram illustrating the control unit 70 and an arrangement related to the control unit 70.

The control unit 70 includes: a CPU 71; a ROM 72 storing various control programs; a RAM 73 having various memories, such as a reception buffer for storing data transmitted from an external data transmitting device PC, for example, a personal computer, a host computer, or the like; a timing control circuit 74 for generating a timing signal to provide the timing for writing received data into and reading it out from the reception buffer; an interface 75 for receiving print data from the external device PC; a video interface 76 that has a scan buffer and sequentially outputs print information converted into bit image data, to a DC controller circuit 82; a sensor interface 77 for receiving detection signals from the toner sensor 33, a sheet feed sensor 51 disposed adjacent to a downstream side of the feed roller 11, and other sensors; and a panel interface 78 for receiving a mode switch signal from the operating panel portion 1C when a control mode is selected from various control modes in the operating panel portion 1C.

The DC controller circuit 82 is connected to: a drive circuit 87 for the main motor 84 that drives a feed-side conveying mechanism including the feed roller 11, the register rollers 13, 14, the photosensitive drum 23 and the like, and a discharge-side conveying mechanism including the heat roller 15, the pressure roller 16, the discharge roller 17, the pinch roller 18 and the like; a drive circuit 89 for a laser diode 85 that forms the laser light emitting section; a drive circuit 90 for a scanner motor 86 that drives the polygon mirror 20; a drive circuit 91 for the fixing heater 15A formed by a halogen lamp and disposed within the heat roller 15; a high-voltage circuit board 92 that causes the photosensitive drum 23, the transfer roller 25, the charger 26, the developing roller 27 and the cleaning roller 30 to produce high-voltage fields, and that turns on the destaticizer lamp 30A.

The ROM 72 stores various ordinary laser-printer control and other programs, for example, memory-managing programs for managing the memory capacity and leading addresses of various memories, such as a font memory storing print dot pattern data regarding many characters, symbols and the like, and the received data buffer, a print image memory, etc. that are provided in the RAM 73, and the like.

Figure 4:
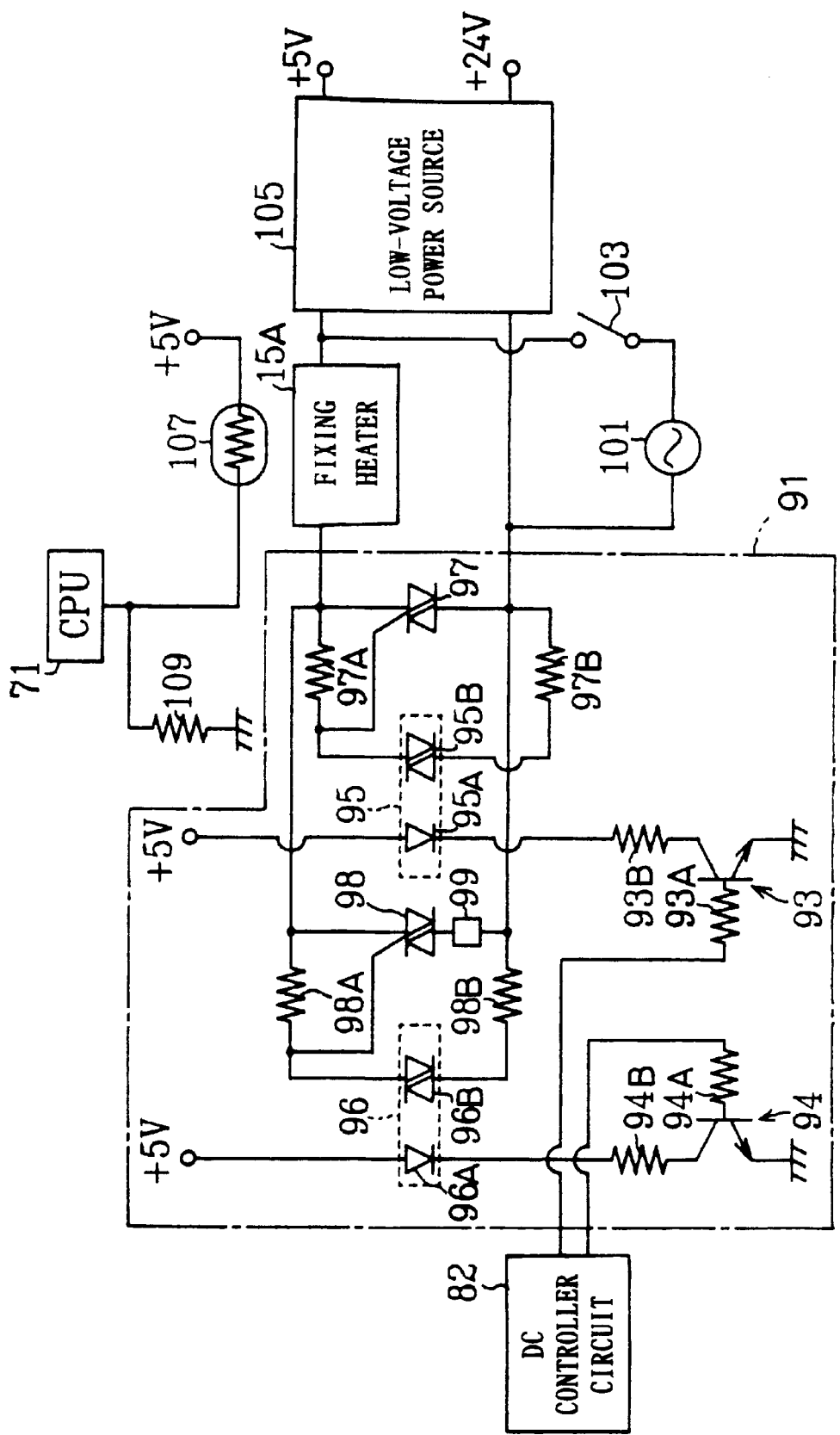
FIG. 4 is a circuit diagram of a drive circuit connected to the control unit.

The construction of the drive circuit 91 for the fixing heater 15A and its surroundings will be described in detail with reference to FIG. 4. The drive circuit 91 has a main portion that includes a transistor 93, another transistor 94, a photo-triac coupler 95, another photo-triac coupler 96, a triac 97, and another triac 98, and various resistors described below.

The DC controller circuit 82 is connected to the base of each of the transistors 93, 94 via resistors, 93A, 94A, respectively so as to switch the transistors 93, 94 individually. The collector of the transistor 93 is connected to a light emitting diode 95A of the photo-triac coupler 95, via a resistor 93B. The two ends of a triac 95B of the photo-triac coupler 95 are connected to the two ends of the triac 97, via resistors 97A, 97B, respectively. The gate of the triac 97 is connected between the resistor 97A and the triac 95B, so that when current flows through the resistor 97A, a gate current in accordance with the voltage fall across the resistor 97A is supplied.

The collector of the transistor 94 is connected to a light emitting diode 96A of the photo-triac coupler 96, via a resistor 94B. The two ends of a triac 96B of the photo-triac coupler 96 are connected to the two ends of a series circuit formed by the triac 98 and an impedance 99, via resistors 98A, 98B, respectively. The impedance 99 may be formed by a resistor, a power thermister or various other means in accordance with a need. The gate of the triac 98 is connected between the resistor 98A and the triac 96B, so that when current flows through the resistor 98A, a gate current in accordance with the voltage fall across the resistor 98A is supplied.

The triac 97 and the series circuit formed by the triac 98 and the impedance 99 are connected in parallel. Connected between the two ends thereof are a series circuit of a commercial power source 101 of AC 100 V, a power switch 103 and the fixing heater 15A. The two ends of a series circuit of the commercial power source 101 and the power switch 103 are connected to a low-voltage power source 105 that outputs DC voltages of 5 V and 24 V.

The thermister 107 is disposed near the fixing heater 15A. One end of the fixing heater 15A is grounded via a resistor 109, and the other end thereof is connected to a 5-V DC power source. The electric potential difference between the thermister 107 and the resistor 109 is input to the CPU 71 via an A/D converter (not shown). By reading the electric potential difference, the CPU 71 is able to detect a temperature in the vicinity of the heat roller 15A. Based on the fixing heater vicinity temperature, the CPU 71 switches on and off the transistors 93, 94 individually, using the DC controller circuit 82 in a manner as described below.

While the power switch 103 is on, the switching-on of the transistor 93 switches on the photo-triac coupler 95 so that current flows through the resistor 97A and the triac 97 becomes on. Thus, the on/off state of the transistor 93 concurs with the on/off state of the triac 97. Similarly, the on/off state of the transistor 94 concurs with the on/off state of the photo-triac coupler 96 and the triac 98. Therefore, if the transistor 93 or the transistor 94 is on, the fixing heater 15A is powered on. If both transistors 93, 94 are off, the fixing heater 15A is not powered on. Since the triac 98 is connected in series to the impedance 99, voltage falls when the triac 98 turns on so that current flows through the impedance 99.

When the triac 97 is on, a voltage (corresponding to first predetermined voltage) substantially equal to the voltage between the two terminals of the commercial power source 101 is applied to the fixing heater 15A, regardless of whether the triac 98 is on or off. When the triac 98 is on but the triac 97 is off, a voltage (corresponding to second predetermined voltage) that is lower than the aforementioned commercial power source voltage by the voltage fall occurring across the impedance 99 is applied to the fixing heater 15A.

Figure 5:
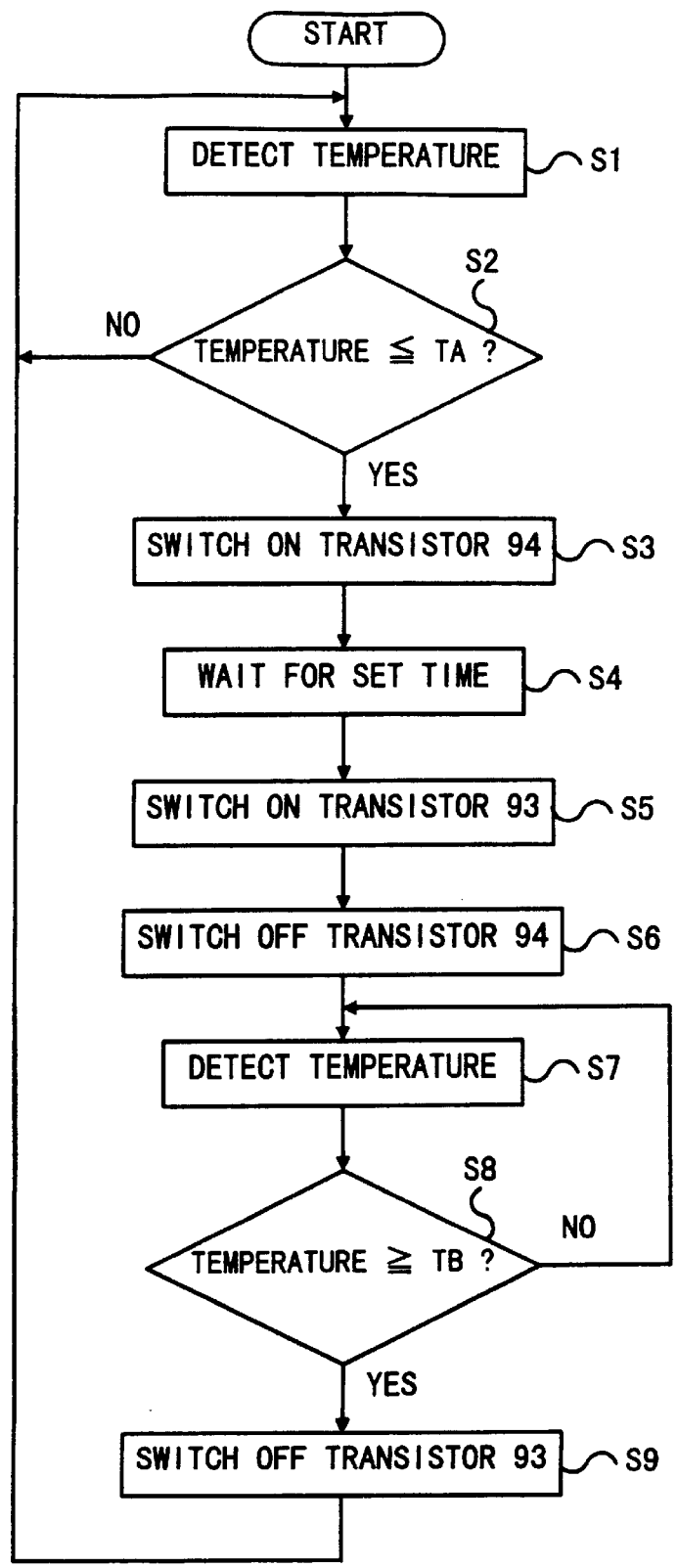
FIG. 5 is a flowchart illustrating the power supply control performed by the drive circuit connected to the control unit.
Figure 6A:
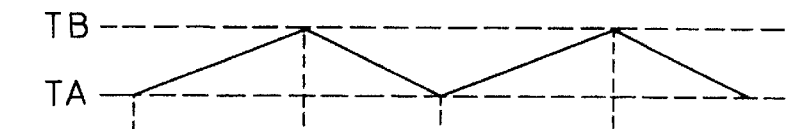
FIG. 6A–6D are timing charts illustrating the power supply control performed by the drive circuit connected to the control unit.
Figure 6B:
Figure 6C:
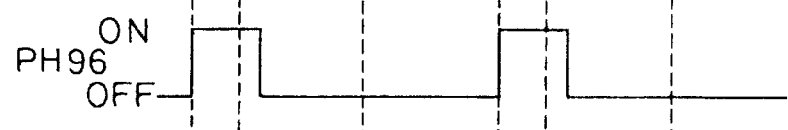
Figure 6D:
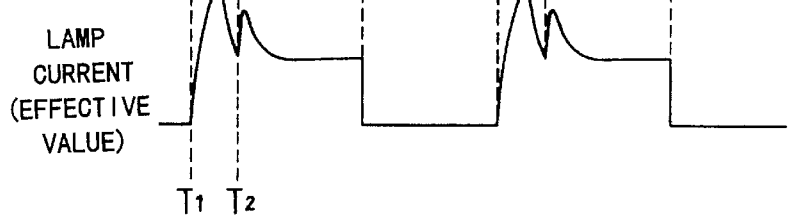
Figures 7A, 7B, 7C:
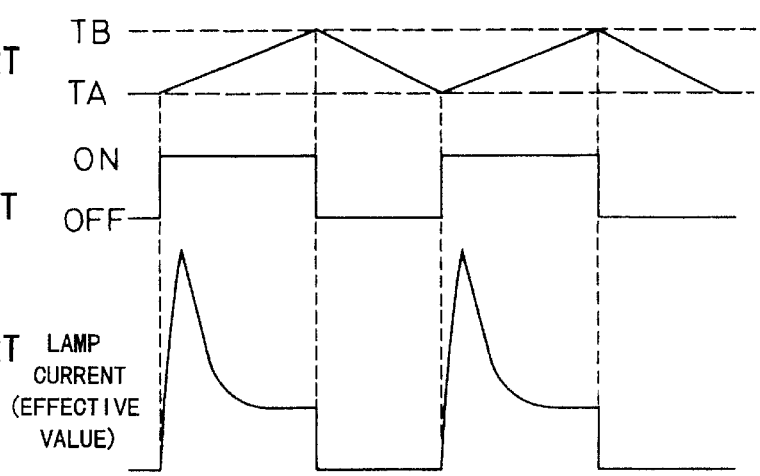
FIG. 7A–7C are timing charts illustrating power supply control performed by a conventional power supply apparatus.

The control performed by the CPU 71 will be described with reference to FIGS. 5 and 6. FIG. 5 is a flowchart illustrating a control performed by the CPU 71. FIG. 6 is a timing chart illustrating the power supply control performed by the drive circuit on the basis of the control performed by the CPU 71.

In step S1 in FIG. 5, the CPU 71 detects a temperature in the vicinity of the fixing heater 15A by using the thermister 107, as in the conventional art described above. Subsequently in step S2, the CPU 71 determines whether the fixing heater vicinity temperature is equal to or lower than a prescribed minimum value TA. If the temperature has decreased to the minimum value TA (YES in step S2), the CPU 71 switches on the transistor 94 in step S3. The light emitting diode 96A is thereby turned on and the photo-triac coupler 96 is switched on. Therefore, current flows through the gate of the triac 98 to turn on the triac 98, so that a relatively low voltage is applied to the fixing heater 15A. After waiting for a predetermined time (for example, 10–100 msec) in step S4, the CPU 71 switches on the transistor 93 in step S5. The light emitting diode 95A is thereby turned on and the photo-triac coupler 95 is switched on. Therefore, current flows through the gate of the triac 97 to turn on the triac 97, so that a relatively high voltage is applied to the fixing heater 15A.

Subsequently in step S6, the CPU 71 switches off the transistor 94, so that the light emitting diode 96A turns off and the photo-triac coupler 96 switches off. When the direction of current from the commercial power source 101 subsequently reverses, the triac 98 is switched off. This state is maintained until the temperature increases to the maximum value TB. That is, in step S7, the fixing heater vicinity temperature is detected. It is determined in step S8 whether the detected temperature is equal to or greater than the maximum value TB. When the temperature increases to the maximum value TB (YES in step S8), the CPU 71 switches off the transistor 93 in step S9, so that the light emitting diode 95A turns off and the photo-triac coupler 95 switches off. When the direction of current from the commercial power source 101 subsequently reverses, the triac 97 is switched off. Both photo-triac couplers 95, 96 are now off, so that no current flows through the fixing heater 15A. This state is maintained until the temperature decreases to the minimum value TA. When it is determined in step S2 that the temperature detected in step S1 is equal to or lower than the minimum value TA (YES in step S2), the CPU 71 switches on the transistor 94 in step S3. Then, the operation described above is repeated.

The power supply control based on the control described above will be described with reference to the timing chart of FIG. 6.

Based on the detection of the temperature in the vicinity of the fixing heater 15A using the thermister 107, the CPU 71 is able to perform control such that the temperature changes between the maximum value TA and the maximum value TB, as described above. As indicated in FIG. 6, when the temperature decreases to the minimum value TA (corresponding to the affirmative determination in step S2 in FIG. 5), the CPU 71 switches on the photo-triac coupler 96 by switching on the transistor 94 at time point T1 in FIG. 6 (corresponding to step S3 in FIG. 5), while maintaining the off-state of the photo-triac coupler 95. Therefore, the triac 98 is switched on, so that a relatively low voltage is applied to the fixing heater 15A. After waiting for a predetermined time, for example, 10–100 msec (corresponding to step S4 in FIG. 5), the CPU 71 switches on the photo-triac coupler 95 by switching on the transistor 93 at time point T2 (corresponding to step S5). Therefore, the triac 97 is switched on, so that a relatively high voltage is applied to the fixing heater 15A.

After switching on the photo-triac coupler 95, the CPU 71 switches off the photo-triac coupler 96 (corresponding to step S6 in FIG. 5), and maintains this state until the temperature increases to the maximum value TB. When the temperature reaches the maximum value TB (corresponding to the affirmative determination in step S8 in FIG. 5), the CPU 71 switches off the photo-triac coupler 95 (corresponding to step S9 in FIG. 5), thereby establishing a state where both photo-triac couplers 95, 96 are off. This state is maintained until the temperature decreases to the minimum value TA. When the temperature reaches the minimum value TA, the CPU 71 switches on the photo-triac coupler 96 and then the photo-triac coupler 95 to repeat the operation described above.

Consequently, the laser printer according to this embodiment is able to reduce the flickering of lighting fixtures, etc. That is, when the photo-triac coupler 96 is on but the photo-triac coupler 95 is off, a relatively low voltage is applied to the fixing heater 15A. Therefore, a significantly large power surge does not occur when the fixing heater 15A is powered on (time point T1) by switching on the photo-triac coupler 96. Furthermore, when a relatively high voltage is applied to the fixing heater 15A by switching on the photo-triac coupler 95 (time point T2), a significantly large power surge does not occur, because the fixing heater 15A has already been powered on. As a result, the lamp current supplied to the fixing heater 15A exhibits a waveform having two relatively low peaks (power surge currents) at time T1, T2 as illustrated in chart (D) of FIG. 6.

In this manner, the laser printer according to the embodiment is able to considerably reduce the occurrence of a power surge at the time of the fixing heater 15A is powered on, thereby substantially preventing the flickering of lighting fixtures and other adverse effects on other electric appliances caused by a power surge. In the foregoing embodiment, the fixing heater 15A constitutes an electrical load, and the arrangement from the transistor 93 to the triac 97 constitutes a first power supply device, and the arrangement from the transistor 94 to the triac 98 constitutes a second power supply device, and the CPU 71 constitutes a power supply control device.

It is to be understood that the invention is not restricted to the particular forms shown in the foregoing embodiment. Various modifications and alterations can be made thereto without departing from the spirit of the invention. For example, although in the foregoing embodiment, the voltage applied to the fixing heater 15A is made different between when the triac 98 alone is on and when the triac 97 is on, by connecting the impedance 99 in series to the triac 98, various other arrangements may also be adopted to change the voltage applied to the fixing heater 15A. For example, an arrangement may be employed wherein the fixing heater 15A is connected to one power source when the triac 97 is switched on, and the fixing heater 15A is connected to another power source when the triac 98 is switched on. However, in an arrangement as in the embodiment where the voltage to the fixing heater 15A is changed by utilizing the voltage fall caused by the impedance 99 while using a single power source, it is possible to simplify the apparatus construction, thereby correspondingly reducing the production costs.

Furthermore, it is also possible to sequentially increase the voltage applied to the fixing heater 15A in three or more steps. Therefore, the power surge can be divided into three or more lower peaks, so that occurrence of light fixtures flickering, and the like, can be more considerably reduced. Further, supplying power to the fixing heater 15A may be stopped by first stopping the power flowing to the first power supply device and, after a predetermined time, stopping the power flowing to the second power supply device. This arrangement also reduces the light fixtures flickering, although the reduction may not be as remarkable as at the time of power on.

The invention may also be applied to various apparatuses other than laser printers, for example, copiers and other image forming apparatuses. The electrical load to which the invention is applicable is not limited to the fixing heat but may also be various other electrical loads. For example, the invention may be applied to the destaticizer lamp 30A, an exposure lamp of a copier, and the like. However, the application of the invention to the fixation heating device, such as the fixing heater 15A or a non-lamp heating device or the like, is highly advantageous. That is, since supplying power to the fixation heating device increases its resistance due to its heat generation, the application of a relatively low voltage (second predetermined voltage) to the electrical load beforehand remarkably reduces occurrence of a power surge when the applied voltage is switched to a relatively high voltage (first predetermined voltage). Thus, in this application of the invention, occurrence of a power surge can be reduced in a further favorable manner.

The invention may also be applied to electrical loads other than lamps. However, since a large power surge normally occurs in lamps such as the fixing heater 15A, the destaticizer lamp 30A, an exposure lamp, and the like, the prevention or reduction of a power surge is particularly important in those lamps. Therefore, the advantages of the invention are remarkable in the foregoing embodiment, wherein the invention is applied to the fixing heater 15A formed by a halogen lamp.

A construction similar to that of the invention is conceivable wherein a plurality of relatively small-size fixing heaters are provided and the number of heaters powered on is gradually increased. Although this construction achieves a current waveform similar, as a whole, to that achieved in this invention, the construction gives rise to the following problems. The provision of a plurality of fixing heaters results in a complicated apparatus construction. Furthermore, since only a reduced number of the fixing heaters are powered on in an initial period of the power supply operation, there is a possibility of non-uniform temperature rise of the heating roller 15 and, therefore, non-uniform fixation. In contrast, the invention can advantageously reduce the occurrence of power surge without causing non-uniform fixation, or the like, while requiring only a simple construction as described above.

What is claimed is:

1. A power supplying apparatus for use in an image forming apparatus for supplying power to an electrical load in the image forming apparatus, comprising:

first power supply means for supplying power to the electrical load by applying thereto a first predetermined voltage;

second power supply means for supplying power to the electrical load by applying thereto a second predetermined voltage that is lower than the first predetermined voltage; and power supply control means for activating the first power supply means after a predetermined delay time has passed since the second power supply means has been activated.

2. The power supplying apparatus for use in an image forming apparatus according to claim 1, wherein the first power supply means and the second power supply means use power from a common power source to supply power to the electrical load.

3. The power supplying apparatus for use in an image forming apparatus according to claim 2, wherein the second power supply means has an impedance which is connected in series between the power source and the electrical load and which is greater than an impedance of the first power supply means, and the second power supply means utilizes a voltage fall by the impedance of the second power supply means so that the second predetermined voltage lower than the first predetermined voltage is applied to the electrical load.

4. The power supplying apparatus for use in an image forming apparatus according to claim 1, further comprising:

switching means for terminating power being supplied by the second power supply means after a predetermined delay time and for starting power being supplied by the first power supply means.

5. The power supplying apparatus for use in an image forming apparatus according to claim 2, wherein the electrical load is fixation-heating means for fixing an image to a recording medium by heating.

6. The power supplying apparatus for use in an image forming apparatus according to claim 5, wherein the fixation-heating means is lamp means for fixing an image to a recording medium by heating.

7. The power supplying apparatus for use in an image forming apparatus according to claim 5, further comprising:

temperature detection means for detecting a temperature in a vicinity of the electrical load; and control means for controlling the first power supply means and the second power supply means on the basis of a result of detection by the temperature detection means.

8. A power supplying apparatus for use in an image forming apparatus for supplying power to an electrical load in the image forming apparatus, comprising:

a first power supply device that supplies power to the electrical load by applying thereto a first predetermined voltage;

a second power supply device that supplies power to the electrical load by applying thereto a second predetermined voltage that is lower than the first predetermined voltage; and a power supply controller that activates the first power supply after a predetermined delay time has passed since the second power supply device has been activated.

9. The power supplying apparatus for use in an image forming apparatus according to claim 8, wherein the first power supply device and the second power supply device use power from a common power source to supply power to the electrical load.

10. The power supplying apparatus for use in an image forming apparatus according to claim 9, wherein the second power supply device has an impedance which is connected in series between the power source and the electrical load and which is greater than an impedance of the first power supply device, and the second power supply device applies to the electrical load the second predetermined voltage lower than the first predetermined voltage, by utilizing a voltage fall by the impedance of the second power supply device.

11. The power supplying apparatus for use in an image forming apparatus according to claim 9, wherein the electrical load is a fixing heater that fixes an image to a recording medium by heating.

12. The power supplying apparatus for use in an image forming apparatus according to claim 11, wherein the fixing heater is a lamp.

13. The power supplying apparatus for use in an image forming apparatus according to claim 9, wherein each of the first power supply device and the second power supply device has a triac.

14. The power supplying apparatus for use in an image forming apparatus according to claim 13, wherein the first power supply device has a photo-triac that controls the triac of the first power supply device, and the second power supply device has a photo-triac that controls the triac of the second power supply device.

15. The power supplying apparatus for use in an image forming apparatus according to claim 14, wherein the first power supply device has a transistor that controls the photo-triac of the first power supply device, and the second power supply device has a transistor that controls the photo-triac of the second power supply device.

16. The power supplying apparatus for use in an image forming apparatus according to claim 8, further comprising:

a temperature detector that detects a temperature in a vicinity of the electrical load; and a controller that controls the first power supply device and the second power supply device on the basis of a result of detection by the temperature detector.

17. The power supplying apparatus for use in an image forming apparatus according to claim 8, further comprising:

a switching unit that stops power being supplied by the second power supply device after a predetermined delay time and for starting the power being supplied by the first power supply device.

18. A power supplying method for use in an image forming apparatus for supplying power to an electrical load in the image forming apparatus, comprising:

supplying power to the electrical load by applying thereto a first predetermined voltage;

supplying power to the electrical load by applying thereto a second predetermined voltage that is lower than the first predetermined voltage; and controlling power supplied to the electrical load by applying the first predetermined voltage after a predetermined delay time has passed since the second predetermined voltage has been activated.

19. The power supplying method for use in an image forming apparatus according to claim 18, wherein power from a common power source supplies power to the electrical load, and between the common power source and the electrical load a first impedance is connected in series which is greater than a second impedance the first impedance causing a voltage fall so that the second predetermined voltage lower than the first predetermined voltage is applied to the electrical load.

20. The power supplying method for use in an image forming apparatus according to claim 18, further comprising:

terminating the second predetermined voltage being supplied to the electrical load after a predetermined delay time.

21. The power supplying method for use in an image forming apparatus according to claim 18, further comprising:

detecting a temperature in a vicinity of the electrical load; and controlling the supply of the first predetermined voltage and the second predetermined voltage on the basis of a result of the detecting step, wherein the electrical load is fixation-heating means for fixing an image to a recording medium by heating.

* * * * *